Patented June 10, 1941

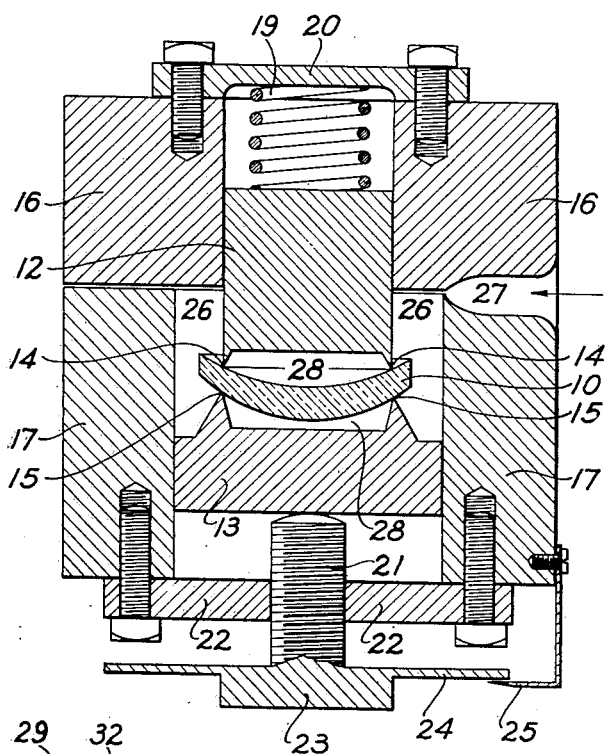

2,245,257

UNITED STATES PATENT OFFICE 2,245,257

LENS MOUNT

Chester W. Crumrine, Rochester, N. Y., assignor to Eastman Kodak Company, Rochester, N. Y., a corporation of New Jersey Application July 25, 1939, Serial No. 286,385

2 Claims. (Cl. 88—57)

This invention relates to optical systems and particularly to lens mounts.

It is an object of the invention to provide a method of mounting lenses and particularly single lenses or elements, alone or as part of a more complex system.

It is a particular object of the invention to provide an extremely inexpensive but highly accurate lens mount which can be safely assembled by simply inserting the mount into a tube provided therefor. The tube may be cylindrical (or conical) with circular, rectangular or any desired cross section.

By way of example, the simple cylindrical case which cylinder has a circular cross section, will be considered in detail. If a lens element such as a meniscus glass element is fitted snugly into a mount there is pressure exerted on the element from all sides toward the optic axis thereof. Such pressure is liable to cause occasional breakage of the lenses during manufacture and to introduce strain into the lens which, from an optical viewpoint, is, of course, quite unsatisfactory and which also makes the lenses susceptible to breakage during later use.

According to the present invention, this pressure on the lens is descreased and the troubles caused thereby eliminated by molding a plastic rim onto the periphery of the lens which rim extends axially from both sides of the lens and has an outer surface which is substantially concave toric. In this connection, the word toric is used to include any surface in which the diameter near the center is less than the diameter near the end of the cylinder. Of course, in the case of a cone the actual diameter of the rim adjacent to the lens may be slightly greater than the diameter at one end of the rim, but since the chamber into which the lens is to be mounted in a camera would also be conical in this case, the effective diameter of the rim near the lens is less than the effective diameter of the rim at either end.

When this arrangement of the rim is used, the rim may be inserted fitting snugly into a cylinder and the pressure of the cylinder on the rim will be exerted mainly on the ends of the rim and not on that portion adjacent to the lens. The lens itself will exert a counterpressure outward on the central part of the rim and the rim will be distorted slightly under these pressures. That is, the rim itself will change in shape so that no excessive pressures will be exerted on the lens element itself.

The present invention is particularly useful with those described in copending applications, Serial Numbers 286,386 and 286,384 filed concurrently herewith by Donald L. Wood and by myself respectively.

Other objects and advantages of the present invention will be apparent from the following description when read in connection with the accompanying drawing in which—

Fig. 1 shows a simple meniscus lens in cross section.

Fig. 2 shows the cross section of the pertinent parts of a molding machine for mounting a lens according to the invention.

Fig. 3 shows one embodiment of the invention.

Fig. 4 shows the embodiment shown in Fig. 3 as mounted in a portion of a camera wall.

In Fig. 1 a meniscus lens element 10 having an optic axis 11 is shown in cross section. The surfaces of this lens have radii of curvature $R1$ and $R2$ respectively and the axial thickness thereof is $T$. Since the element as shown is in that stage of manufacture in which it has not yet been centered, the diameter thereof taken from the optic axis is different in different directions as indicated by $H1$ and $H2$.

In Fig. 2 the lens element 10 is held by a zonal clamp consisting of members 14 and 15 in a molding machine comprising molds 16 and 17. The zonal clamp members 14 and 15 are carried by plungers 12 and 13 respectively, the plunger 12 being held in place by a spring 19 and a plate 20 and the plunger 13 being held in place by a screw 21 in a plate 22 having an adjusting knob 23 with scale 24 and index 25.

According to the invention a rim is molded onto the element 10 by injecting a plastic through an injection nozzle 27 into the chamber 26 around the periphery of the lens. The zonal clamp members 14 and 15 prevent any of the plastic entering chamber 28 adjacent to the central portions of the lens surfaces. According to the invention, the molding machine is so arranged that the outer surface of the rim is slightly concave. This is best seen in Fig. 3 wherein the rim of the lens 10 is indicated as 30. The outer surface 29 of this rim is seen to be concave toric. Incidentally, since the lens 10 is held by a zonal clamp in the mold, the outer periphery of this rim 30 is optically centered on the axis 11 as indicated by the arrows H.

Furthermore, I have made the surprising discovery, that a rim molded as shown in the drawing, which rim has an axial length greater than its radial thickness and which rim extends axially from both sides of the lens, will have the required concave surface 29 if it is made by injecting the molding into a mold whose walls are straight and cylindrical. That is, although the mold itself has straight walls the rim when finished and removed from the mold will assume a shape in which the outer surface is concave toric.

As shown in Fig. 4, this lens 10 in its rim 30 may be inserted snugly into a chamber, for example, in the wall of a camera. The rim 30 is pushed into this chamber until the end surface of the rim comes in contact with an abutment 33 in such a camera wall 32, which is also provided with an aperture 35 which acts as the aperture for the lens 10.

The Fig. 4 illustrates the advantage of this type of rim. As is shown, the rim 30 fits snugly into a cylinder in the housing 32 so that pressure indicated by arrows 36 is exerted on the ends of this rim 30. The fit is snuggest at the ends of the rim. Due to the curvature of the surface 29, there is no direct pressure on the rim 30 adjacent to the lens element 10. On the other hand, the element 10 exerts a counterpressure 37 outward on the rim 30 and together with the pressure exerted at the point 36, this pressure distorts the rim 30 bending it to or towards a shape in which the outer surface 29 thereof is perfectly cylindrical and not concave. Actually of course, the surface 29 remains slightly concave even when inserted in the chamber provided therefor. Although the curvature 29 is very slight and the amount of distortion of the rim 30 which is permissible is also very small, this invention succeeds in reducing the pressure on the lens 10 sufficiently to eliminate breakage during manufacture and strain in the lens after it is mounted in a camera.

Obviously by having the injection nozzle and the line of separation of the mold shown in Fig. 2 at a point opposite to the lens 10 instead of at one end of the rim chamber 26, the mold could be arranged so that the concavity of the surface 29 could be any desired amount. However, I have found that sufficient concavity and in fact an almost ideal arrangement is produced when the surface of the mold 17 is perfectly flat, or more correctly is perfectly cylindrical.

If the radial thickness of the rim 30 is too great, compared with its axial thickness, i. e., its length, the resiliency of the rim is reduced to a point where little advantage is gained by the invention. However, it is difficult to state exactly when this advantage becomes negligible, but in general the radial thickness of the rim should not be greater than its length and of course the length should be sufficient to extend axially from both sides of the rim of the lens 10.

Having thus described in detail one embodiment of my invention, I wish to point out that it is not limited to the specific structure shown but is of the scope of the appended claims.

What I claim and desire to secure by Letters Patent of the United States is:

1. A camera lens mount comprising a camera wall having a tubular aperture therein, an abutment on the inner wall of the tubular aperture, a plastic rim holding said lens in axial alignment in the aperture and fitting snugly in the tubular aperture against said abutment, the outer surface of the rim being concave toric whereby the fit is snuggest near the front and rear edges of the rim.

2. An optical system comprising a tubular lens mount, abutment means on the inner wall of the tubular mount, a lens axially aligned in the mount and a plastic rim for the lens fitting snugly in the mount and against the abutment means, the outer surface of the rim being concave in section and the fit between the rim and the mount being tightest at the front and rear edges of the rim.

CHESTER W. CRUMRINE.